United States Patent [19]

Karato

[11] 3,745,236

[45] July 10, 1973

[54] COLOR TELEVISION CAMERA EQUIPMENT

[75] Inventor: Yoshiteru Karato, Tokyo, Japan

[73] Assignee: Shiba Electric Co., Ltd., Tokyo, Japan

[22] Filed: Nov. 6, 1970

[21] Appl. No.: 87,382

[30] Foreign Application Priority Data

Nov. 10, 1969 Japan ................................ 44/89335

[52] U.S. Cl. ........................ 178/5.4 ST, 350/162 SF

[51] Int. Cl. ................................................ H04n 9/06

[58] Field of Search ............................... 178/5.4 ST; 350/162 SF

[56] References Cited

UNITED STATES PATENTS

| | | | |
|---|---|---|---|
| 3,015,689 | 1/1962 | Hirsch | 178/5.4 ST |
| 2,787,655 | 4/1957 | Stahl et al. | 178/5.4 ST |
| 3,300,580 | 1/1967 | Takagi et al. | 178/5.4 ST |
| 2,907,817 | 11/1959 | Teer | 178/5.4 ST |
| 3,510,575 | 5/1970 | Dillenburger et al. | 178/5.4 ST |
| 3,575,548 | 4/1971 | Kurokawa | 178/5.4 ST |
| 3,566,018 | 2/1971 | Macovski | 178/5.4 ST |

*Primary Examiner*—Robert L. Griffin
*Assistant Examiner*—George G. Stellar
*Attorney*—Chittick, Pfund, Birch, Samuels & Gauthier

[57] ABSTRACT

A striped color filter device is provided which comprises at least two striped color filter elements. The color filter elements are capable of preventing the transmission therethrough of at least one color and disposed out of phase with each other by one-fourth pitch. Also there is provided a striped filter for generating a reference frequency. A plurality of electrical signals may be derived from one image tube.

5 Claims, 15 Drawing Figures

INVENTOR.
YOSHITERU KARATO

BY
Chittick, Pfund, Birch, Samuels & Gauthier

ATTORNEYS

INVENTOR.
YOSHITERU KARATO

BY
Chittick, Pfund, Birch, Samuels & Gauthier
ATTORNEYS

INVENTOR.
YOSHITERU KARATO

BY
Chittick, Pfund, Birch, Samuels & Gauthier
ATTORNEYS

COLOR TELEVISION CAMERA EQUIPMENT

BACKGROUND OF THE INVENTION

The present invention relates to a color television camera equipment and more particularly a color television camera equipment capable of deriving a plurality of color signals from a single image tube.

In general the color television camera separates into three primary color component parts the optical image picked up by the camera and converts this into electrical signals by three image tubes through three fibers. Therefore the camera equipment becomes inevitably large in size and heavy in weight and the associated circuitry is very complicated.

SUMMARY OF THE INVENTION

The primary object of the present invention is therefore to provide an improved color television camera equipment.

Another object of the present invention is to provide an improved color television camera equipment capable of deriving a plurality of color signals by a signal image tube.

It is a further object of the present invention to provide an improved color television camera equipment capable of deriving a plurality of color signals of the optical image of an object picked up by the camera by a single image tube.

In brief, the present invention provides a color television camera equipment comprising an image pick up tube, a striped color filter assembly interposed in the optical path between the image pick up tube and object to be televised, a bias light source and a striped filter for generating a reference frequency by selectively transmitting light from said bias light source and synthesizing with light transmitted through the color filter. The color filter assembly comprises at least two striped color filter elements which are disposed so that their strips or stripes are out of phase with each other by one-fourth pitch and each of the striped color filter elements is capable of preventing the transmission of the light energy falling into the range of at least one color of the spectrum of the subject. Thus a plurality of color signal components may be derived from the signle image tube.

The present invention will be more apparent from the following description of the preferred embodiments thereof taken in conjuction with the accompanying drawing.

DESCRIPTION OF THE PREFERRED EMBODIMENT

Figure 1:
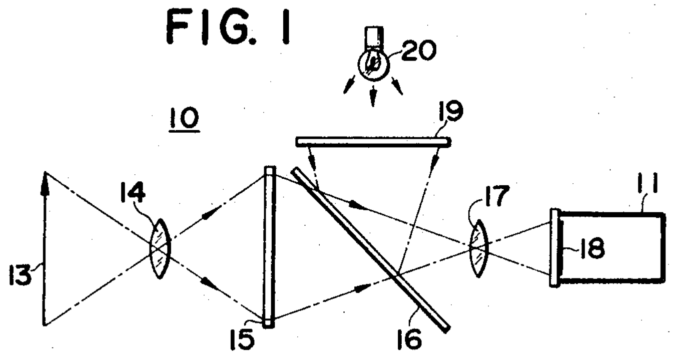
FIG. 1 is a diagrammatic view illustrating the fundamental construction of the color television camera equipment in accordance with the present invention.

FIG. 1 illustrates schematically the fundamental construction of a color television camera equipment in accordance with the present invention. The optical section television camera generally designated by 10 includes an image tube 11, a taking lens 14, a striped filter assembly 15 to be described in more detail hereinafter, a half-mirror 16, a relay lens 17, a striped filter 19 for generating a reference frequency and a bias light source 20 for illuminating the striped filter 19. An object 13 to be televised is focused upon a photoconductive faceplate 18 of the image tube 11.

Figure 2:
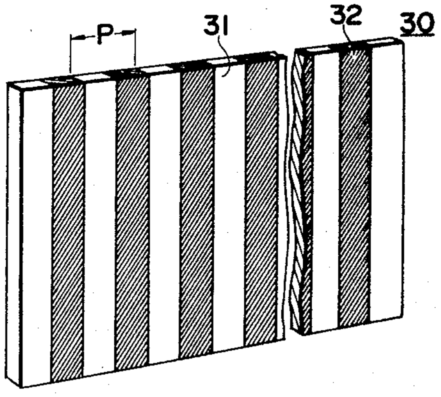
FIG. 2 is a perspective view illustrating one example of a striped color filter used in the present invention.

FIG. 2 illustrates a striped color filter 30 constituting the striped color filter assembly 15. The color filter 30 comprises two kinds of striped color filter elements 31 and 32 alternately arrayed upon the same plane. These striped color filter elements 31 and 32 have the different light absorption characteristics. For example, the elements 31 may transmit all of the light energy in the spectrum of the incident light from the object while the elements 32 may transmit all of the light energy except a that of a predetermined wavelength. The determination of the pitch P, that is the sum of the two widths of the elements 31 and 32 will be described in more detail hereinafter.

Figure 3A:
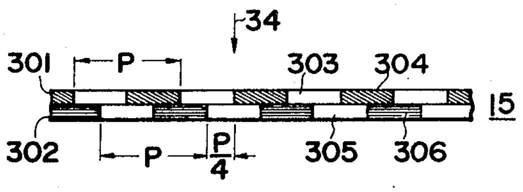
FIG. 3A is a fragmentary view of a striped color filter assembly used in the equipment shown in FIG. 1.

FIG. 3A illustrates the striped color filter assembly 15 comprising two striped color filter 30 of the type described. The first and second color filter 301 and 302 are overlaid upon each other as shown so that the color filter strips may be oriented in the same direction. Both of the color filter 301 and 302 have the same pitch P and are so arranged as to be displaced relative to the other by one-fourth pitch as viewed from FIG. 3–A.

When white light is made incident upon the color filter assembly 15 from the direction indicated by the arrow 34, the transmitted colors are illustrated in FIG. 3B – 3E. It is assumed that the color striped filter elements 303 of the first color filter 301 transmit all of the light energy, that is all of the colors, while the elements 304 prevent the transmission of red. The elements 305 of the second color filter 302 transmit all of the light energy, that is all of the colors, while the elements 306 serve to prevent the transmittion of blue.

Figure 3B:
FIGS. 3B – 3E are graphs illustrating the color signal components obtained by the camera of the present invention when the white light from an object to be televised is impinted upon the striped color filter assembly shown in FIG. 3A.
Figure 3C:
Figure 3D:
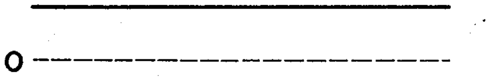

In consequence, when the white light is incident upon the color filter assembly 15, it is separated into the color components a shown in FIGS. 3B, 3C and 3D. More particularly, FIG. 3B illustrates the red color component impinging upon the faceplate of the image tube 11; FIG. 3C, the blue component; and FIG. 3D, the green color component. From FIGS. 3B and 30 it is seen that both of the red and blue color components may be sampled at an interval of the pitch P and are out of the phase by one-fourth pitch with each other, which is the most important feature of the present invention as will be described in more detail hereinafter.

Figure 4A:
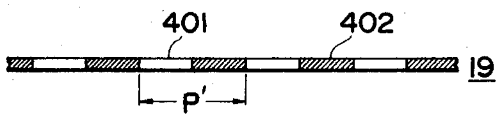
FIG. 4A is a fragmentary view illustrating the striped filter for generating a reference frequency utilized in the camera shown in FIG. 1.

FIG. 4A illustrates the striped filter 19 for generating the reference frequency comprising filter elements 401 and 402 which are alternately arrayed upon the same plane and have the different absorption characteristics relative to the light from the bias light source 20. For example, the filter elements 401 transmit all of the light energy while the filter elements 402 prevent the tansmission of all of the light energy. In this case, the incident bias light may be transmitted as shwon in FIG. 4B. The pitch P' of the striped light filter 19 may be arbitarily selected independent of the pitch P of thecolor filter assembly 15.

The color of the bias light source 20 may be also arbitarily selected. It may be while light or any colored light may be utilized as long as the light incident upon the faceplate of the image tube 11 may be varied by the filter 19.

Figure 5:
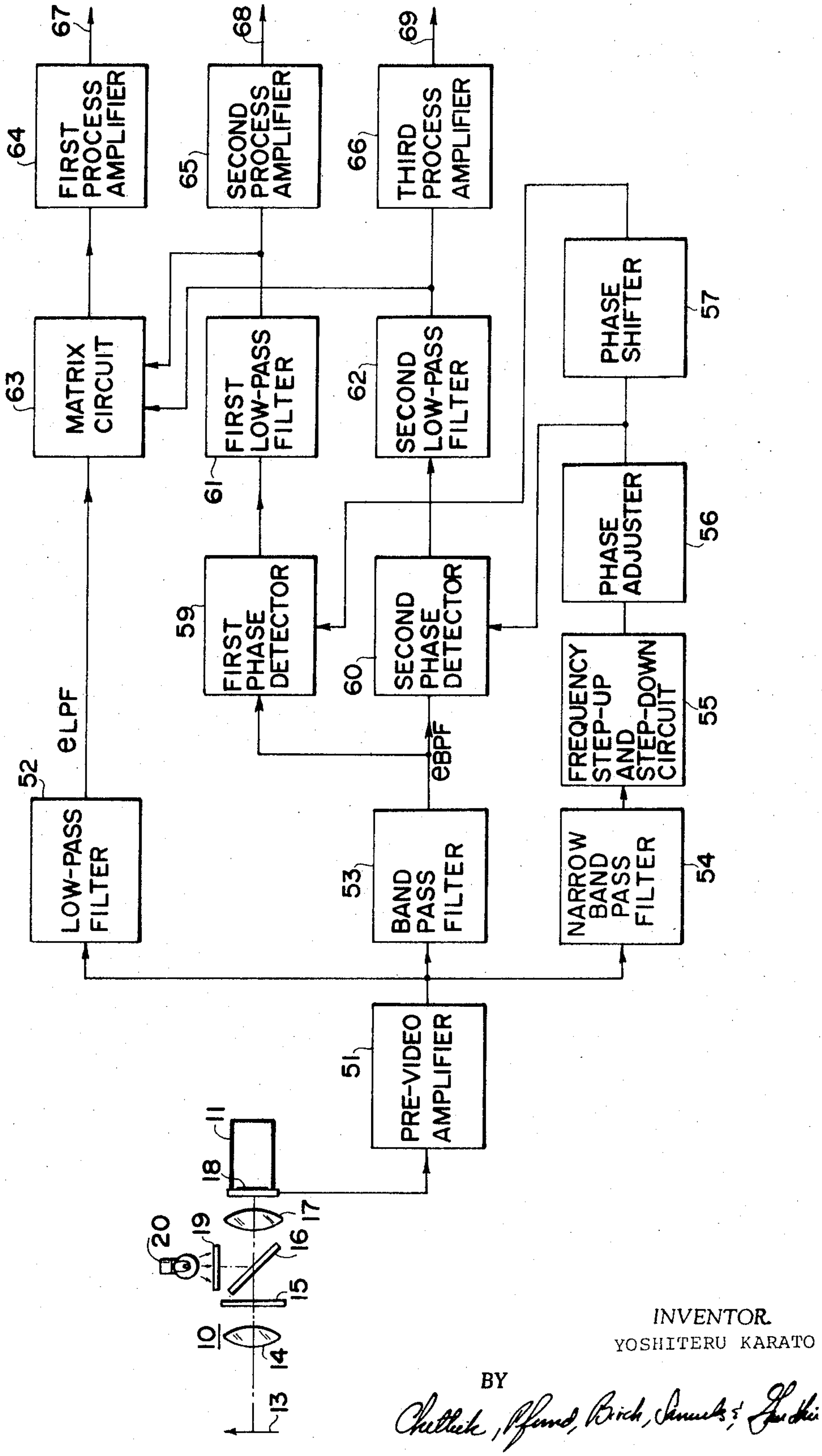
FIG. 5 is a block diagram of the associated circuit of the camera shown in FIG. 1.

FIG. 5 illustrates the optical system shown in FIG. 1 and the associated circuitry constituting the color television camera in accordance with the present invention. Reference numeral 51 designates a pre-video-amplifier for amplifying the video signals from the image tube 11 to a predetermined level; 52, a low-pass filter for deriving the direct video signal component from the output of the pre-amplifier 51; 53, a band-pass filter for deriving the modulated signal component from the output of the image tube 11; 54, a narrow-band pass filter for deriving the reference frequency from the output of the pre-amplifier 51; 55, a frequency step-up and step-down circuit for deriving from the output of the narrow-band pass filter 54 the reference frequency fc and the carrier frequency *fo;* 56, a phase adjuster for adjusting the phase of the carrier with the frequency f*o* so that the modulated signal may be phase-detected; and 57, a phase shifter for shifting the phase of the carrier with the frequency of fo by 90°. This phase shifter 57 is required for phase-detecting and shifting the phase angle because the red color signal carrier is out of phase by 90° relative to the blue color carrier.

Reference numeral 59 designates a first phase-detector for demodulating the red color signal from both of the outputs from the band-pass filter 53 and the phase shifter 57;60, a second phase detector for deomdulating the blue color signal from both of the outputs from the band-pass filter 53 and the phase adjuster 56;61 and 62, a first and secnd low-pass filters for removing the harmonics and the carriers from the outputs of the first and second detectors 59 and 60 so as to derive only the required signal components respectively;63, a matrix circuit for reciving the outputs from the first and second low-pass filters 61 and 62 so as to remove the blue and red color signal components in the output from the low-pass filter 52;and 64, 65 and 66, a first, second and third process amplifiers. The output of the matrix circuit 63 is applied to the first process amplifier 64; the output of the first low-pass filter 61, to the second process amplifier 65; and the output of the second low-pass filter 62, to the third process amplifier. These process amplifiers 64, 65 and 66 have the function of establishing the black level relative to the green, red and blue color signals, inserting the fly-back line blanking signal, accomplishing the gamma correction and so on, and their outputs are applied to the exterior circuit through the lines 67, 68 and 69.

Figure 3E:
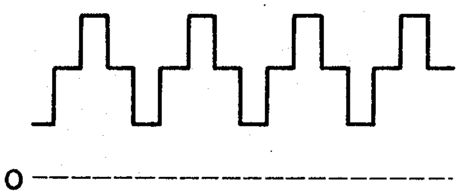

Next the mode of operaton will be described hereinafter. The object 13 is focused upon the striped color filter assembly 15 through the taking lens 14 so that the image is separated into the different colors. Thereafter the image is re-focus upon the faceplate 18 of the image pick up tube 11 through the half-mirror 16 and the relay lens 17. The image of the striped filter for generating the reference frequency is focused also upon the faceplate 18 of the image tube 11 through the half-mirror 16 and the relay lens 17. Thus both of the images of the object 13 and the striped filter 19 are superposed upon the faceplate of the image tube 11. It is noted that the intensity of light of these images are also superposed. The image upon the faceplate of the image pick up tube 11 may be scanned by scanning the electron beam at an angle relative to the longitudinal axis of each of the color filter strips of the striped color filter assembly 15. The output of the image tube 11 is illustrated in FIG. 3E, where the time is plotted against the *x*-axis and the output voltage against the *y*-axis. It should be noted that the output of the image tube 11 is the summation of the red, blue and green color signals.

The output is amplified by the pre-amplifier 51 to a predetermined level and then fed to the low-pass filter 52, the bandpass filter 53 and the narrow-band-pass filter 54 respectively. Only the reference frequency component is derived from the output of the pre-amplifier 51 through the narrow-band-pass filter 54 and is changed from the reference signal frequency *fc* to the carrier freqeuncy *fo* in the frequency step-up and step-down circuit 55. The output is then applied to the phase adjuster 56 so that the signal is adjusted to have the phase required for phase detection. The output from the phase adjuster 56 is applied to the phase detecting circuit 59 and 60 respectively. In this case the signal to be applied to the first phase detector 59 is shifted by 90° by the phase shifter 57.

The band-pass filter 53 derives the modulated frequency component from the output of the pre-amplifier 51 and the modulated frequency component is fed into the first and second phase detectors 59 and 60 rspectively for demodulation. In this case, the outputs from the phase shifter 57 and the phase adjuster 56 are utilized. The red color signal is derived from the first phase detector 59 while the blue color signal is derived from the second phase detector. These color signal components are transmitted on the lines 68 and 69 respectively through the second and third process amplifiers after the harmonics and the carriers in the signal components are removed in the low-pass filters 61 and 62 respectively.

The direct video signal component is derived from the output of the pre-amplifier 51 through the low-pass filter 52 and then fed into the matrix circuit 63, where the green color signal component may be derived directly from the video signal component because the outputs from the first and second low-pass filters 61 and 62 are fed into the matrix circuit 63. The green color signal component is transmitted on the line 67 through the first process amplifier.

The red, blue and green color signal components may be represented by the output voltages indicated in FIGS. 3B, 3C and 3D respectively.

Next the underlying principle of the present invention will be analyzed hereinafter. Let it be assumed that each of the first and second striped color filter 301 and 302 in the color filter assembly 15 consists of N pairs of first and second striped color filter elements; that the scanning time of the electron beam in the image tube 11 is T microseconds; and that the fly-back line blanking time is *t* microseconds. Then, the repetitive sampling frequency for sampling the red and blue color components is given by $$fo = (N/T-t) \text{ MHz} \tag{1}$$

In Japan the standard electron beam scanning time *T* is 63.5 us while the blanking time *t* is 10.8 ms.

Each of the red and blue color components $E_R$ and $E_B$ from the image tube 11 may be expanded in Fourier series as follows:

$$E_R=\frac{1}{2}+\sum_{n=0}^{\infty}(-1)^n\frac{2}{(2n+1)}\cos(2n++1)w_{0t} \tag{2}$$

$$E_B=\frac{1}{2}+\sum_{n=0}^{\infty}\frac{2}{(2n+1)}\sin(2n+1)w_{0t} \tag{3}$$

where $\omega_o$ is the angular frequency of the repetitive sampling frequency fo given by $$w_0=2\pi f_0 \tag{4}$$

In Eqs. (2) and (3), it is assumed that the peak value of each of the color signals be unity ( =1) since white light is incident upon the televisin camera from the object 13, but it may naturally be varied because the light from the object is not white in practice.

When the color filter assembly 15 is removed from the color television camera shown in FIG. 1, the red, blue and green color components is the output of the image tube are given below:

$$E_{R'} = A_R + B_R \cos\Omega_R t \tag{5}$$

$$E_{B'} = A_B \ddagger B_B \cos\Omega_B t \tag{6}$$

$$E_{G'} = A_G + B_G \cos\Omega_G t \tag{7}$$

where $A_{R'}$ $A_B$ and $A_G$ : direct components of the color signal components in the output of the image tube;

$B_{R'}$ $B_B$ and $B_G$ : peak values of the AC components in the color signal components in the output of the image tube; and $\Omega_{R'}$ $\Omega_B$ and $\Omega_G$ : angular frequencies relative to the maximum frequencies of the AC components in the output of the image tube.

When the striped color filter assembly 15 is incorporated in the television camera, the red, blue and green color components in the output of the image tube are given below:

$$e_R=(A_R+B_R\cos\Omega_R t)\left\{\frac{1}{2}+\sum_{n=0}^{\infty}(-1)^n\times\frac{2}{(2n+1)}\cos(2n+1)\omega_0 t\right\}$$
$$=\frac{1}{2}(A_R+B_R\cos\Omega_R t)+\sum_{n=0}^{\infty}(-1)^n\times\frac{2}{(2n+1)\pi}\{(A_R+B_R\cos\Omega_R t)\times\cos(2n+1)\omega_0 t\} \tag{8}$$

$$e_B=(A_R+B_B\cos\Omega_B t)\left\{\frac{1}{2}+\sum_{n=0}^{\infty}\frac{2}{(2n+1)\pi}\sin(2n+1)\omega_0 t\right\}$$
$$=\frac{1}{2}(A_B+B_B\cos\Omega_B t)+\sum_{n=0}^{\infty}\frac{2}{(2n+1)\pi}\times\{(A_B+B_B\cos\Omega_B t)\sin(2n+1)\omega_0 t\} \tag{9}$$

$$^{e}G = (A_G + B_G \cos\Omega_G t) \tag{10}$$

By comparison with Eqs. (5), (6) and (7), it is seen that the first term in Eq. (8) is one half the red color component given by Eq. (5). The second term of Eq. (8) represents the signal derived when the white light from the object 13 is sampled by the striped color filter assembly 15 and is derived from the image tube 11 as the modulated waves whose carriers are frequency *fo* and its odd-harmonics dependent upon the number of pair N of striped color filter elements of the assembly 15 and the line blanking time *t* of the image tube 11. In this case if $\Omega_R<\omega_o$, is seen that the image of the object may be transmitted by the frequency fo without any distortion.

Same is true for Eq. (9). The first term in Eq. (9) represents the direct signal component in the output from the image tube produced by the blue color component of the white color from the object 13. The second term represents the modulated component.

Eq. (8) is different from Eq. (9) in that there exists the phase difference in carrier because the first striped color filter 301 is displaced by one-fourth pitch relative to the second striped color filter element 302 as viewed from FIG. 3A.

The green color component given by Eq. (10) is not sampled by the striped color filter assembly 15 so that it has only the direct component.

Next the signal obtained from the reference frequency generating striped filter 19 will be discussed. It is assumed that the filter 19 has a number of M pairs of different filter element strips. Then the output signal $e_s$ is given by $$e_s=C\left\{\frac{1}{2}+\sum_{n=0}^{\infty}\frac{2}{(2n+1)\pi}\cos(2n+1)\omega_c t\right\} \tag{11}$$

where $\omega_c$ = angular frequency of the carrier frequency $f_c$ ($\omega_c = 2\pi fc$); and $C$ = peak value of the output of the image tube through the filter 19.

It is seen that the signal obtained by the image tube through the reference signal generating striped filter 19 contains the direct component, the fundamental frequency $fc$ and its odd harmonics.

It is noted that the fundamental frequency $fc$ may be arbitrarily selected by suitably selecting the number M of pairs of filter strips 401 and 402 of the filter 19. In the instant embodiment, the number M is so selected that the frequency $fc$ satisfies the following relation;

$$fc = n/m\ fo \tag{12}$$

where $n$ and $m$ = positive integers, which are so determined that interferring signals or noise may be minimized in the predetermined range of the video signal freqeuncy in consideration the band of the video signal of the image pick up tube 11.

Thus it is seen that the output of the image pick up tube 11 is summation of Eqs. (8, (9) (10) and (11).

When the output of the image pick up tube 11 is fed into the lowpass filter 52 through the amplifier 51, only the direct components in Eqs. (8), (9) and (10) are derived. That is, the first terms of the equations are derived, so that the resulting composite signal $e_{LPF}$ is $$e_{LPF} = (A_G + B_G \cos\Omega_G t) + \tfrac{1}{2}(A_R + B_R \cos\Omega_R t) + \tfrac{1}{2}(A_B + B_B \cos\Omega_R t) \tag{13}$$

In the band-pass filter 53, a band centered around the frequency fo and the sidebands of the red and blue color components $\frac{1}{2}\pi(\omega_o \pm \Omega_R)$ and $\frac{1}{2}(\omega_o \pm \Omega_B)$ are passed, but other frequencies are suppressed. Thus the filter output $e_{BPF}$ $$e_{BPF} = 2/\pi[(A_R + B_R \cos\Omega_R t)\cos\omega_o t + (A_B + B_B \cos\Omega_B t)\sin\omega_o t] \tag{14}$$

From Eq. (14) it is seen that the output signal $e_{BPF}$ is multiplexed signal consisting of signals with the phase difference of 90° derived from phase modulating the carrier freqeuncy $fo$ by the red and blue color components $(A_R + B_R \cos\Omega_R t)$ and $(A_B + B_B \cos\Omega_B t)$, respectively. In consequence when the signal $e_{BPF}$ represented by Eq. (14) is fed into the first and second phase detectors 59 and 60 respectively, the red and blue color signal components $(A_R + B_R \cos\Omega_R t)$ and $(A_B + B_B \cos\Omega_B t)$ may be derived independently. The carrier used in phase detection will be described in more detail hereinafter.

When the output $e_{LPF}$ of the low-pass filter is fed into the matrix circuit 63, the green color component may be derived as follows. In addition to the output $e_{LPF}$, the outputs from the first and second low-pass filters 61 and 62 containing the red and blue color signal components are so fed into the matrix 63 as to be substracted from the input thereto. Thus the second and third terms in Eq. (13) are eliminated so that only the green color signal component is derived from the circuit 63 independently.

Next the carrier with the freqency $fo$ for phase detecting the signal represented by Eq. (14) will be discussed hereinafter. When the output of the image pick up tube 11 is applied to the narrow-band-pass filter 54 through the pre-amplifier 51, the narrow band signal centered around the frequency $fc$ is derived. By the circuit 55 is derived the fundamental component $e_{st}$ of the second term in Eq. (11)

$$e_{st} = (2c/\pi)\cos\omega_c t = (2c/90)\cos 2\pi f_c t \tag{15}$$

When the signal represented by Eq. (15) is stepped up to m times in frequency and then stepped down to $1/n$, the carrier frequency $fo$ is obtained from Eq. (12). The reason why $fc = n/m\ fo$ is not to mix the carrier $fc$ in the band of the signals represented by Eqs. (13), the output of the low-pass filter $e_{LPF}$, and (14) the output of the band-pass filter 53 $e_{BPF}$, but to easily convert the frequency $fc$ into $fo$. This is done by the circuit 56 and for detecting the blue color signal component the output is directly applied to the second phase detector 60. However, for the detection of the red color signal component the output of the circuit 56 is fed into the first phase detector 59 through the circuit 57.

Figure 6:
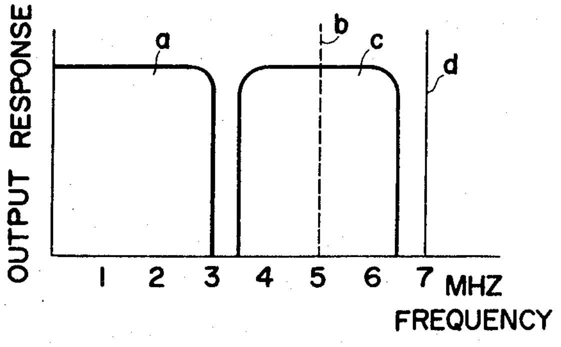
FIG. 6 is a graph showing one example of the frequency-output response characteristic curves of the camera of the present invention.

FIG. 6 shows the typical frequency versus output response characteristic curves of the color television camera in accordance with the present invention. The curve $a$ indicates the signal component represented by Eq. (13) and has the bandwidth of 3MHz in the instant embodiment. The broken line b indicates the carrier frequency $fo$ (5MHz in the instant embodiment) in Eq. (14). The area $c$ indicates the signal component represented by Eq. (14) and has the bandwidth of +1.5 MHz. The line $d$ indicates the fundamental frequency $fc$ in Eq. (12), which is 7/5 $fo$ in the instant embodiment.

Figure 7A:
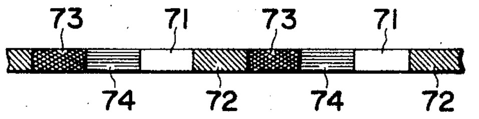
FIGS. 7A and 7B are fragmentary views of the variations of the striped color filter assembly.
Figure 7B:
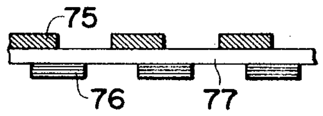

FIGS. 7A and 7B illustrate a variation of the color filter assembly employed in the present invention. This color filter assembly may attain the same function as the filter assembly 15 shown in FIG. 3. Four types of color filter elements 71, 72, 73 and 74 are arrayed on the same plane, and the color filter element 71 may transmit all of the light energy; the element 72 prevents the transmission of the red color; the element 73 transmits only the green color; and the strip 74 prevents the transmission of the blue color.

FIG. 7B illustrate a variation of the striped color filter assembly in which color filter elements 75 and 76 are overlaid on both sides of the transparent base plate 77 with a one-fourth pitch as shown.

Figure 8:
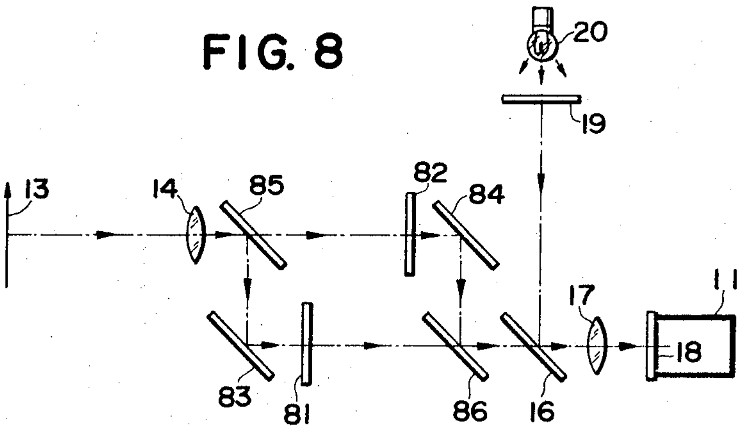
FIGS. 8 and 9 are examples of block diagrams of a second and third embodiments of the present invention.

FIG. 8 illustrates schematically another embodiment of the color television camera in accordance with the present invention in which the combination of the image tube 11 with the striped color filters is different from the first embodiment described hereinabove. The parts identical to those in FIG. 1 are designated by the same reference numerals. Reference numerals 81 and 82 designate a first and second stripped color filters the combination of which corresponds to the striped color filter assembly 15 of the first embodiment shown in FIG. 1; 83 and 84, the reflecting mirrors; and 85 and 86, half-mirrors. The first and second striped color filters 81 and 82 are disposed in the different optical paths. The light passed through the taking lens 14 from the object 13 is split into two beams by means of the half-mirror 85. One of the split light beams is reflected by the reflecting mirror 83 so as to be focused upon the first color filter 81 while the other light beam is focused upon the second color filter 82. The image upon the first color filter 81 is further focused upon the faceplate 18 of the image pick up tube 11 through the two half-mirrors 86 and 16 and the relay lens 17. The image focused upon the second striped color filter 82 is superposed upon the image from the first color filter 81 through the half-mirror 86 after redirected by the reflecting mirror 84. As in the case of the first embodiment, the image of the reference frequency generating filter 19 which is illuminated by the bias light source 20 is focused upon the faceplate 18 of the image tube 11 through the half-mirror 16 and the relay lens 17.

The first striped color filter 81 has the same construction with that of the first striped color filter element 301 of the color filter assembly 15 shown in FIG. 3A, and comprises the color filter elements which are adapted to transmit all of the light energy and the color filter elements which may prevent the transmission of the red color. The second color filter 82 has the same construction with that of the second striped color filter 302 of the color filter assembly 15 shown in FIG. 1 and comprises the color filter elements which may transmit all of the light energy and the second filter elements which prevent the transmission of the blue color component. When the images of the color filter strips of the filter 81 are focused upon the faceplate 18 of the image pick up tube 11 with the same pitch as those of the filter 82 but out of phase by one-fourth pitch as in the case of the color filter assembly indicated by FIG. 3A, the same fefect as that of the color filter assembly 15 in the first embodiment will be attained. In the second embodiment it should be noted that the actual dimensions and pitches of the color filters 81 and 82 may be different from each other as long as the pitches of the images focused upon the faceplate 18 of the image tube 11 are equal. In other words, the striped color filters having the different pitches may be utilized if the pitches of the color filters focused upon the faceplate 18 of the image tube 11 are made equal optically.

Figure 4B:
FIG. 4B is a graph illustrating the light signal component obtained through the striped filter shown in FIG. 4A.

The arrangement of the reference frequency generating striped color filter 19 and the bias light source 20 is same with that of the first embodiment described with reference to FIGS. 1, 4A and 4B, so that no further detailed description will be made.

Figure 9:
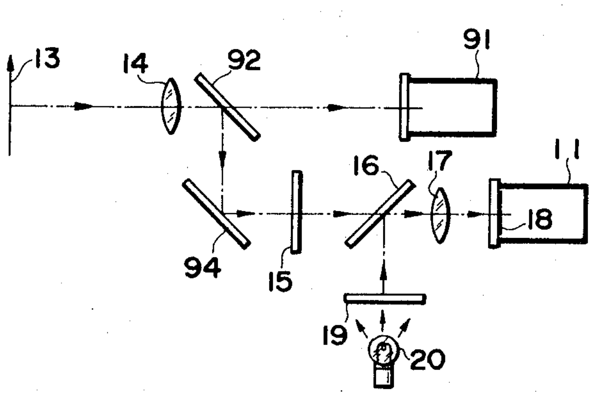

FIG. 9 illustrates the third embodiment of the present invention applied to a television camera employing a picture brightness or luminance signal separation system. The same components as those in the first embodiment shown in FIG. 1 are designated by same reference numerals. Reference numeral 91 designates an image pick up tube for deriving the luminance signal; 92 a half-mirror and 94, a reflecting mirror. The light beam from the object 13 through the taking lens 14 are split into two beams by the half-mirror 92. One of the split beams is directed toward the image tube 91, while the other beam is focused upon the striped color filter assembly 15 through the reflecting mirror 94. The image focused upon the color filter assembly is focused again upon the faceplate 18 of the image tube 11 through the half-mirror 16 and the relay lens 17 while the image of the reference frequency generating striped color filter 19 is focused upon the faceplate 18 of the image pick up tube through the half-mirror 16 and the relay lens in the same manner as in the case of the first embodiment.

In the instant embodiment, the high quality video signal is derived from the image tube 11 while the high quality brightness or luminance signal from the image tube 91.

In the instant embodiment instead of the half-mirror 92, a dichroic mirror may be employed. A dichroic mirror may reflect the color for which it is made and pass all other colors through it. When the mirror 92 is made to pass only the green color, the red and blue color signal components may be derived from the image tube 11 while the green color sinal component is derived from the image tube 91. Therefore it is seen that the signal output from the image tube 91 is the high quality output which may be advantageously used in the simplified luminance separation system.

What is claimed is:

1. A color television camera equipment comprising an image pick up tube, a striped color filter assembly interposed between an object and said image tube, a bias light source, and a striped filter for generating a reference frequency and disposed so as to selectively transmit the light from said bias light source and combine said light with light transmitted through said striped color filter assembly, said striped color filter assembly comprising first and second striped color filters; said first color filter comprising a plurality of alternately arrayed first and second color filter strip elements, said first color filter strip element being capable of transmitting all of the light from said object while said second color filter strip element being capable of preventing the transmission of the light from said object falling into the range of at least one first color; said second color filter comprising a plurality of alternately arrayed third and fourth color filter strip elements, said third color filter strip element being capable of transmitting all of the light from said object while said fourth color filter strip element being capable of preventing the transmission of the light falling into the range of a color different from said first color; said strip elements of said first and second striped color filters being of substantially equal widths and said first and second striped color filters being disposed so that stripe images of said filters focused on said pick-up tube are out of phase by one-half of said width relative to each other.

2. The color television camera equipment as specified in claim 1 wherein said first striped color filter is disposed in contact with said second striped color filter.

3. The color television camera equipment as specified in claim 1 wherein said first and second striped color filters are disposed in different optical paths, and including means for focusing light from said first and second striped color filters upon said image pick up tube so that the stripe images from said first and second striped filters on said tube are out of phase by one-half of said width relative to each other.

4. The color television camera equipment as specified in claim 1 further comprising a low-pass filter for deriving the direct video signal component from the output signal of said image pick-up tube, a band-pass filter for deriving the modulated signal component from the output signal of said image pick-up tube, a narrow-band-pass filter for deriving the reference frequency from the output signal of said image pick-up tube, means for generating a carrier frequency in response to the output of said narrow-band-pass filter, and means for demodulating the light from said object in response to the output of said means for generating by processing the outputs from both of said low-pass and band-pass filters.

5. The color television camera equipment as specified in claim 4 wherein said means for demodulating comprises first and second phase detectors for phase-detecting the output of said band-pass filter, means for supplying said carrier frequency to said second phase detector, means for shifting the output of said means for supplying by 90° and having its output connected to said first phase detector, and a matrix circuit to which are applied the outputs from said low-pass filter and said first and second phase detectors, whereby each of the color signal components of light from said object may be obtained from said first and second phase detectors and said matrix circuit.

* * * * *

UNITED STATES PATENT OFFICE
CERTIFICATE OF CORRECTION

PATENT NO. : 3,745,236

DATED : July 10, 1973

INVENTOR(S) : Yoshiteru Karato

It is certified that error appears in the above-identified patent and that said Letters Patent are hereby corrected as shown below:

Column 1, line 11, "fibers" should be -- filters --;
line 45, "signle" should be -- single --;

Column 3, line 1, "of the" should be -- out of --;
line 10, "tansmission" should be -- transmission --;
line 12, "shwon" should be -- shown --;

line 17, "while" should be -- white --;
line 48, "deomdulating" should be -- demodulating --;
line 51, "secnd" should be -- second --;

Column 4, line 3, "operaton" should be -- operation --:
line 7, "re-focus" should be -- re-focused --
line 46, "rspectively" should be -- respectively --;
Column 5, line 38, "televisin" should be -- television --;
line 43, "is" should be -- in --;
line 64, "striped color filter" should be -- color striped filter --;
Column 7, line 21, "freqeuncy" should be -- frequency --;
Column 9, line 35, "fefect" should be -- effect --;
Column 10, line 1, after "tube" insert -- 11 --;
line 14, "sinal" should be -- signal --.

Signed and sealed this 17th day of June 1975.

(SEAL)
Attest:

RUTH C. MASON
Attesting Officer

C. MARSHALL DANN
Commissioner of Patents and Trademarks